United States Patent [19]
Nielsen

[11] Patent Number: 4,713,169
[45] Date of Patent: Dec. 15, 1987

[54] FLUID FEED METHOD

[75] Inventor: Richard H. Nielsen, Bartlesville, Okla.

[73] Assignee: Phillips Petroleum Company, Bartlesville, Okla.

[21] Appl. No.: 841,148

[22] Filed: Mar. 19, 1986

Related U.S. Application Data

[62] Division of Ser. No. 689,676, Jan. 8, 1985, abandoned.

[51] Int. Cl.$^4$ .............................................. C10G 11/18
[52] U.S. Cl. .................................... 208/157; 208/113; 422/140
[58] Field of Search ............... 208/153, 157, 158, 159, 208/164, 113, 166; 422/140, 143, 144; 239/132.5, 132.3, 427.5, 431

[56] References Cited

U.S. PATENT DOCUMENTS

| | | | |
|---|---|---|---|
| 2,491,099 | 12/1949 | Fisher | 196/52 |
| 2,891,000 | 6/1959 | Metrailer | 208/157 |
| 2,891,001 | 6/1959 | Wickham et al. | 208/163 |
| 2,982,718 | 5/1961 | Constantikes | 208/113 |
| 2,985,517 | 5/1961 | Harper | 208/164 X |
| 3,042,196 | 7/1962 | Payton et al. | 208/113 |
| 3,071,540 | 1/1963 | McMahon et al. | 208/163 |
| 3,152,065 | 10/1964 | Sharp et al. | 208/153 X |
| 3,161,582 | 8/1967 | Wickham | 208/74 |
| 3,473,530 | 10/1969 | Urbanowicz | 261/78 A |
| 3,607,730 | 9/1971 | Pfeiffer | 208/164 |
| 3,654,140 | 4/1972 | Griffel et al. | 208/113 |
| 4,097,243 | 6/1976 | Bartholic | 208/164 |
| 4,310,411 | 1/1982 | Wilkening | 208/153 |
| 4,331,533 | 5/1982 | Dean et al. | 208/113 |
| 4,332,674 | 6/1982 | Dean et al. | 208/120 |
| 4,422,925 | 12/1983 | Williams et al. | 208/104 X |
| 4,427,537 | 1/1984 | Dean et al. | 208/157 X |
| 4,450,241 | 5/1964 | Hettinger, Jr. et al. | 208/164 X |
| 4,503,334 | 1/1986 | Hays et al. | 208/157 X |
| 4,531,675 | 7/1985 | Muck | 239/290 |
| 4,537,357 | 8/1985 | Culbertson | 239/290 |
| 4,555,328 | 11/1965 | Krambeck et al. | 206/113 X |
| 4,562,046 | 12/1985 | Hays et al. | 208/157 X |

FOREIGN PATENT DOCUMENTS 0063901 11/1982 European Pat. Off. .

OTHER PUBLICATIONS

Cheremisinoff, N. P. et al., *Handbook of Fluids in Motion*, Ann Arbor, Mich., Ann Arbor Science: The Butterworth Group, 1983, pp. 803 and 804.

Primary Examiner—Andrew H. Metz
Assistant Examiner—Glenn Caldarolo
Attorney, Agent, or Firm—William R. Sharp

[57] ABSTRACT

A fluid feeding apparatus and method for feeding a fluid to a point beyond the apparatus, wherein a hollow member is provided having an interior surface which defines a chamber having a first fluid therein. The interior surface tapers toward the chamber axis from an open end of the member to an interior surface boundary axially opposite the open end of the member. A second fluid is injected into the chamber generally toward the opening formed at the open end.

5 Claims, 6 Drawing Figures

FLUID FEED METHOD

This is a divisional of pending application Ser. No. 689,676 filed Jan. 8, 1985 now abandoned.

BACKGROUND OF THE INVENTION

This invention relates to an apparatus for feeding fluid to a point beyond the apparatus. In another aspect, this invention relates to a fluid feeding method.

The present invention is particularly suitable for use in a catalytic cracking environment wherein the fluid is oil feedstock. In such an environment, the oil feedstock is fed to a mixing zone where it mixes with a fluidized catalyst.

In one type of catalytic cracking unit, oil and an atomizing gas, such as steam are ejected from a plurality of nozzles in an atomization chamber. The chamber has an open end from which the oil and steam are released. Catalyst is introduced across the open end of the chamber so as to mix with the atomized oil. The mixture thus formed then passes into a riser-reactor where cracking of the oil feedstock takes place in a conventional fashion. Hot catalyst particles flowing into the atomization chamber through its open end can cause erosion of the chamber wall. In addition, any oil which accumulates on the chamber wall might break down into coke, due to the extreme heat of the chamber wall, and possibly cause some clogging of oil or gas nozzles within the chamber. It is also desirable that a uniform exit velocity of the atomized oil be achieved to attain optimum mixing of catalyst and oil in the mixing zone.

SUMMARY OF THE INVENTION

It is, therefore, an object of the present invention to provide an improved atomization chamber.

It is also an object of the present invention to provide an atomization chamber wherein coke buildup and wall erosion are minimized, and in which a relatively uniform exit velocity of atomized oil is achieved.

The above objects are realized in an apparatus and method wherein a hollow member is provided having an interior surface which defines a chamber, and wherein the interior surface progressively tapers generally toward the chamber axis from an open end of the member to a boundary axially opposite the open end. The chamber thus formed has a first fluid therein into which a second fluid is injected generally toward an opening formed at the open end of the member.

According to preferred embodiments of the present invention, a member as described above is utilized to define an atomization chamber in a catalytic cracking unit. In these embodiments, the second fluid is oil feedstock. Atomization gas is also injected into the chamber for atomizing the oil, wherein the first fluid is a background gas within the chamber which includes the atomization gas. In two embodiments, substantially all of the interior surface of the member tapers to the boundary which is at a second end of the member opposite the open end. According to one of these two embodiments, the interior surface is generally parabolic in shape, whereas in the other embodiment, the interior surface is generally conical in shape. According to another pair of embodiments, the interior surface of the member comprises first and second portions, wherein the first portion tapers as described above to the boundary, and the second interior portion extends axially toward the open end such that the second portion has an upper end. The second portion tapers toward the chamber axis from the boundary to the upper end. Each interior surface portion may be either generally parabolic or conical in shape.

An atomization chamber for a cracker unit constructed according to the present invention minimizes the formation of eddies therein caused by backflow of the background gas within the chamber. These eddies can have entrained catalyst particles associated therewith, which can cause erosion of the member forming the chamber. The eddies can also cause accumulation of oil on the member interior surface which can lead to coke buildup on the interior surface. Thus, since the present invention minimizes eddies, catalyst erosion and coke buildup are also minimized. In addition, minimizing formation of eddies within the chamber enhances the likelihood of a relatively uniform exit velocity of the atomized oil.

DESCRIPTION OF THE PREFERRED EMBODIMENTS

Figure 1:
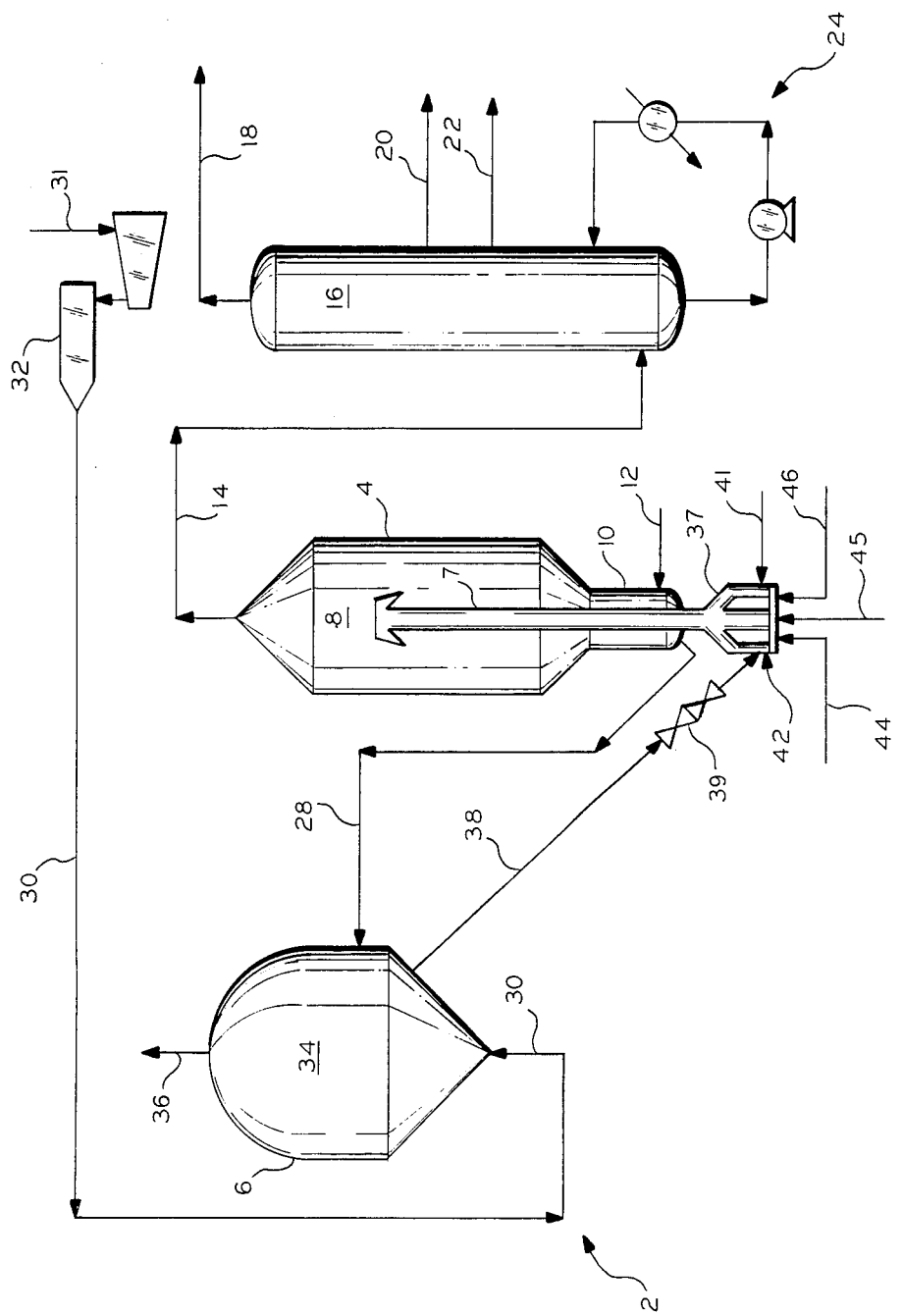
FIG. 1 is a schematic illustration of certain features of one type of catalytic cracking unit which employs a lift pot.

With reference to FIG. 1, one type of fluid catalytic cracking unit (FCCU) 2 comprises a reactor 4 and a regenerator 6. The reactor 4 comprises a riser reactor or transfer line reactor 7, a catalyst/product separation zone 8 which usually contains several cyclone separators, and a stripping section or zone 10 in which gas, usually steam such as introduced from line 12, strips entrained hydrocarbon from the coked catalyst, although the invention has applicability to transfer line reactors oriented other than vertically as well. Overhead product from the separation zone 8 is conveyed via line 14 to a separation zone 16 such as the main fractionator where it is separated, for example, into light hydrocarbons which are withdrawn from the zone 16 by the line 18, gasoline range liquids which are withdrawn by the line 20, distillates which are withdrawn by the line 22, and slurry oils, cycle oils, unreacted feed and the like which can be recycled in the recycle means 24 as required.

After being stripped in the zone 10, the cracking catalyst is conveyed from the zone 10 to the regenerator 6 by the line 28 for coke burnoff. In the regenerator 6, oxygen containing gas is introduced by a line 30 which is connected to a source of oxygen containing gas such as the air compressor 31 and heater 32. Coke deposits are burned from the catalyst in the regenerator 6 forming an effluent gas which is separated from the catalyst in a separation portion 34 of the regenerator 6 which usually contains a plurality of cyclone separators. These flue gases are withdrawn from the regenerator 6 by the line 36. Hot regenerated catalyst passes from the regenerator 6 to a lift pot 37 at the lower end of the riser reactor 7 by line 38, which provides a source of hot cracking catalyst particles for the riser reactor.

The catalyst flow rate through the cracking unit is controlled by valves 39 which are positioned in the line 38, preferably in a vertical portion thereof.

In the lift pot 37, catalyst from the line 38 is fluidized with a fluidizing gas, usually steam, which is introduced into the lift pot 37 by line 41. The oil feedstock is introduced into the lift pot 37 via a nozzle cartridge assembly 42 which preferably emits a fine mist axially into the riser or transfer line reactor at the lower end thereof. A line 44 is shown as connecting the nozzle cartridge assembly 42 with a source of heavy oil feedstock, although the invention can also be used to crack exclusively light oils if desired. A line 45 can then connect the nozzle cartridge assembly with a source of light gas oil, or the like. Atomizing gas such as steam can be added to the nozzle cartridge assembly 42 by line 46 which connects the nozzle cartridge assembly to a steam source.

The operating conditions for the riser reactor 7 and regenerator 6 can be conventional. Usually, the temperature in the riser reactor 7 will be in the range of from about 850° to 1050° F. The oil is usually admixed with steam at a weight ratio of oil to steam in the range of from about 6:1 to about 25:1. A catalyst oil weight ratio employed in the riser reactor 7 is generally in the range of from about 2:1 to about 30:1, usually between about 3:1 and about 15:1. Pressure in the riser reactor 7 is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser reactor is generally from about 10 to 30 feet per second in the lower portions and up to between about 40 and about 120 feet per second in the upper portions. The contact time between the catalyst and oil in the riser reactor is generally in the range of from about 1 to about 4 seconds, usually from 1.5 to about 3 seconds where the oil is injected into the bottom of the riser. The regenerator is operated at a temperature typically in the range of from about 1100° to about 1500° F. and is ordinarily provided with sufficient oxygen containing gas to reduce the coke on the catalyst to a level of about 0.5 weight percent or less, preferably less than 0.1 weight percent.

Catalysts suitable for catalytic cracking includes silica alumina or silica magnesia synthetic microspheres or ground gels and various natural clay-type or synthetic gel-type catalysts. Most preferably, fluidizable zeolite-containing cracking catalysts are employed. Such catalysts can contain from about 2 to about 20 percent based on total weight of zeolitic material, such as Y-zeolite, dispersed in a silica alumina matrix and have an equilibrium B.E.T. surface area in the range of 25–250 m$^2$/g and a particle size chiefly in the range of 40 to 80 microns.

Figure 2:
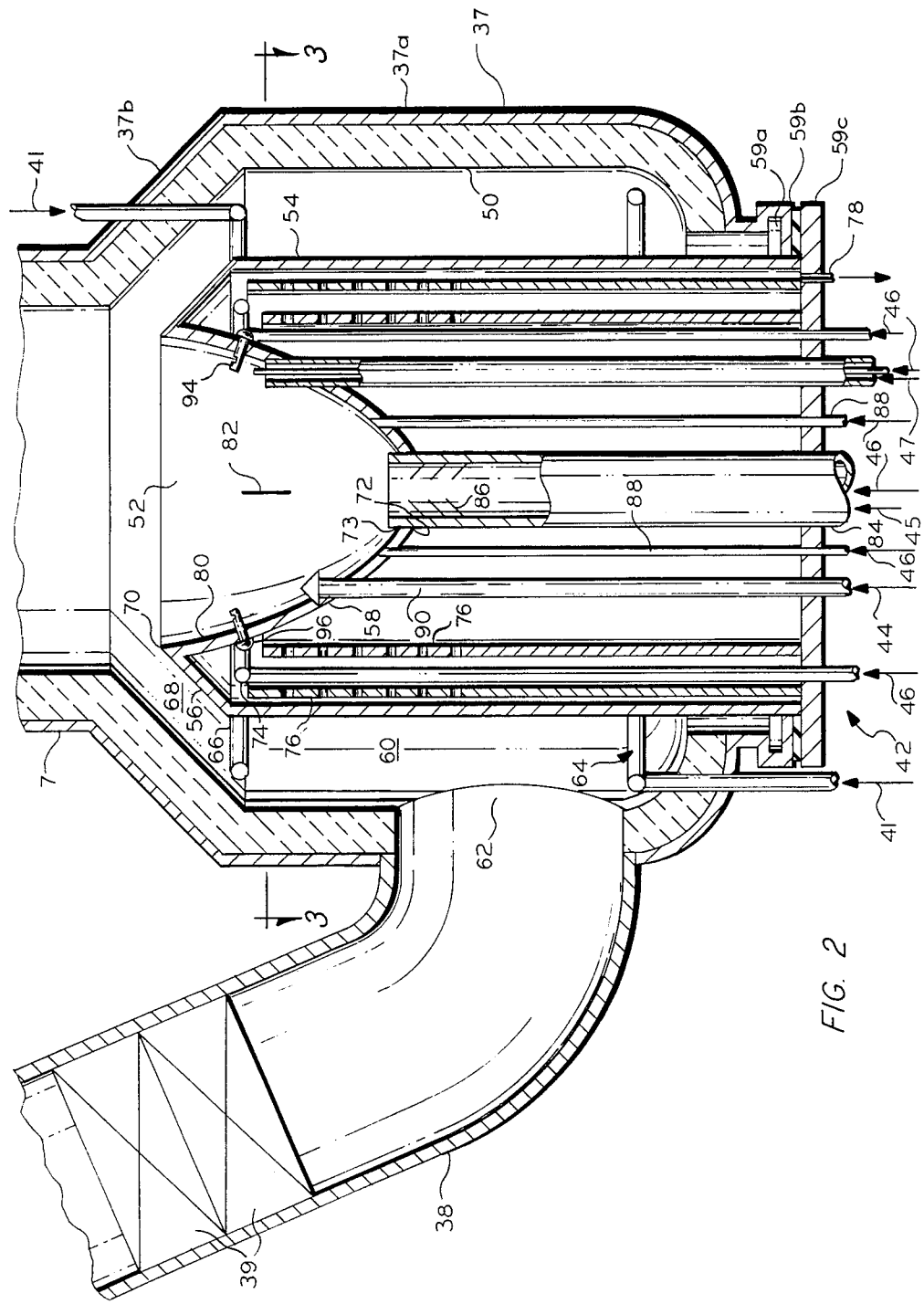

Referring now to FIG. 2, there is shown a cross-sectional view of lift pot 37. Lift pot 37 includes a generally cylindrical section 37a and a generally frustoconical section 37b whose upper end is connected to the lower end of riser 7 as shown. Usually, the interior surface 50 will be formed from a refractory material to resist rapid erosion from the hot catalyst. A nozzle assembly, shown generally at 42, is mounted generally coaxially within lift pot 37 and serves to house various oil and atomizing steam nozzles which empty into an atomization chamber 52. Oil is accordingly atomized in the chamber so as to exit the chamber and pass up riser 7. As shown, nozzle assembly 42 includes a generally cylindrical wall 54, a frustoconically shaped end wall, and a wall 58 which will be described in further detail below in conjunction with description of the internal details of the nozzle assembly. Preferably, for maintenance purposes, it is very desirable that the assembly 42 be removable as a unit. One manner of providing for this is to form a lift pot 37 with a port 59a at its lower end adapted for receiving the generally cylindrical exterior surface of the wall 54. A generally annular flange 59b is positioned around the port. The generally cylindrical exterior surface of the wall 54 is provided with a generally annular flange 59b mounted thereon sealingly contacting the generally annular flange 59b at the lower end of the lift pot.

A generally annular space 60, hereinafter called a catalyst lift chamber, is formed between the interior surface 50 of the lift pot and the exterior surface of nozzle assembly 42. A port 62 is provided in the lift pot such that hot catalyst particles flowing through line 38 may pass into lift chamber 60. Preferably, the cracking catalyst is fluidized prior to being mixed with the oil feed. For catalyst aeration or fluidization, a means 64 is positioned in the catalyst lift chamber 60 for distributing a fluidized gas such as steam from steam source 41 into the catalyst lift chamber adjacent a lower end of the catalyst lift chamber 60. The means 64 preferably distributes fluidizing gas in the lower portion of lift pot to start vertically upward flow of the cracking catalyst. More preferably, a second means 66 for distributing a fluidizing gas such as steam from the source 41 is positioned in the catalyst lift chamber 60 at a position adjacent or below catalyst acceleration zone 68. Usually, the means 64 and 66 will each be formed from an annular distributor having a sidewall with a plurality of ports therethrough which connects its interior with circumferentially spaced apart positions in the catalyst lift chamber 60. The ports through the sidewall of the annular distributor constituting the means 64 can be oriented downwardly or upwardly to lift the catalyst introduced into the catalyst lift chamber 60 via port 62 to the annular distributor constituting the means 66. The ports through the sidewall of the distributor 66 will generally be oriented toward the lower end of the riser reactor and toward zone 68. In this manner, the cracking catalyst can be conveyed in dilute phase at a desired velocity through acceleration zone 68 and generally radially inward past the open upper end 70 into the mouth of the riser 7. Atomized oil exiting chamber 52 mixes with the catalyst accordingly so that the mixture flows up riser 7 where cracking of the oil continues.

Details of the nozzle assembly 42 will now be set forth. As shown, wall 58 has an open upper end 70 which forms an opening, and a lower end 72 opposite end 70. An interior surface boundary 73 lies at lower end 72 so as to be adjacent to central nozzle 84 and axially opposite the opening formed at the upper end of wall 58. As used herein and in the appended claims, the term "boundary" may include many points along a curve or only a single point. Wall 58 is connected at its upper end to end wall 56, and axially extends toward the bottom end of the nozzle assembly so that a cavity is formed between the wall 58 and walls 56 and 54. An annular fluid distributor 74 is provided having a sidewall and a plurality of ports through its sidewall at spaced apart positions along its length connected to the fluid source 46 and positioned in the cavity between the wall 58 and the wall 54 at a position closely adjacent the end wall 56. Steam from distributor 74 serves to cool the nozzle assembly. To further reduce heat penetration from the catalyst lift chamber 60 to the atomization chamber 52, one or more radiation shielding members or baffles 76 can be positioned between the wall 58 and the wall 54. The radiation shielding members 76 provide radiation shielding between the walls to reduce heat penetration into the atomization chamber 52 and the possibility of coke buildup. The radiation shielding members 76 can be in the form of tubular baffles extending circumferentially around and longitudinally through the cavity between walls 54 and 58 and this arrangement is presently preferred. The tubular baffles 76 are provided with apertures which are preferably radially nonaligned as between adjacent baffles so as to prevent or mitigate heat penetration by radiation. Other types of radiation shielding, such as bronze turnings, raschig rings and the like can be employed if desired. The cooling fluid introduced into the cavity between the wall 54 and the wall 58 can be withdrawn or exhausted from the cracking unit such as via tube or port 78 which also is positioned in flow communication with the cavity.

An interior surface 80 of wall 58 defines chamber 52 which has an axis 82. In this particular embodiment, surface 80 is generally parabolic in shape, and oriented such that its base corresponds to upper end 70. Thus, substantially all of the interior surface 80 tapers toward axis 82 from the open end to boundary 73 at the lower end 72 of the wall. As shown, upper end 70 is open, and atomization chamber 52 is in fluid communication with lift pot 37. Furthermore, wall 58 is oriented such that chamber 52 is generally coaxial with respect to lift pot 37 and riser 7. The length of chamber 52 as measured along axis 82 will depend on steam and oil rates, oil viscosity, oil boiling point and other parameters.

Various nozzles preferably extend through wall 58 and empty into atomization chamber 52 so as to inject oil and an atomization fluid, usually steam, into chamber 52. Preferably, a central nozzle 84 extends through wall 58 generally along axis 82 so as to empty into chamber 52 near end 72 of wall 58. Nozzle 84 comprises a pipe having turbulence generating members 86 which can be pentagonally shaped and mounted to the inside of the pipe. Members 86 serve to breakup oil flow along the wall thereof where velocities are high enough to result in annular two-phase flow. In addition, the central nozzle is preferably connected to a source of gas oil 45. Steam from distributor 74 can be allowed to leak into chamber 52 through a gap (not shown) between wall 58 and nozzle 84 so as to assist in atomizing gas oils being emptied into chamber 52 from nozzle 84. Due to the parabolic shape of chamber 52, oil droplets which have impinged on surface 80 of the wall travel down to the central nozzle 84 and are redispersed by the atomization steam flowing from the gap. In this regard, it may be desirable to place another annular distributor at a position below that of distributor 74 and closely adjacent to wall 58 as an additional source of atomization steam. It should be understood that many alternative designs for central nozzle 84 are possible. For example, nozzle 84 as shown and described could be replaced by a nozzle of the type which includes two concentric tubes, wherein the inner tube has a helical vane structure therein. In this type of nozzle, the inner tube would be connected to the source of gas oil, and the annulus formed between the inner and outer tube would be connected to a source of atomization steam.

Nozzle assembly 42 further comprises a plurality of nozzles 88 (only two of which are shown) circumferentially spaced apart around central nozzle 84 and axis 82, and positioned so as to empty into chamber 52 from positions closely adjacent to interior surface boundary 73. As shown, each nozzle 88 comprises a tubular member connected to a source of atomizing gas 46, usually steam. Thus, nozzles 88 inject atomizing gas into chamber 52 to assist in atomizing oil released in the chamber. Additionally, atomizing gas from nozzles 88 assists in redispersing oil which has traveled down interior surface 80, and also serves to redisperse dead catalyst which can accumulate at the bottom of the chamber.

A plurality of nozzles 90 and 92 extend through wall 58 so as to empty into chamber 52 from positions spaced around axis 82. Most preferably, each nozzle 90 (only one of which is shown in FIG. 2) is a tubular member connected to a source of topped crude oil 44, and each nozzle 92 (only one is shown in FIG. 2) is a shear or whistle type nozzle connected to a source of slurry oil 47. A portion of the illustrated nozzle 92 has been cut away to show internal details. As shown, nozzle 92 comprises an outer tube connected to the source of slurry oil, and an inner tube connected to a source of atomizing gas 46. The inner tube is coaxially positioned within the outer tube, and has a slot in its sidewall which extends only partially around the circumference of the inner tube. Atomizing gas exits the slot in a direction toward axis 82 so as to shear slurry oil exiting from the outer tube. As shown, nozzles 92 are radially spaced farther from axis 82 than nozzles 90 such that the positions from which oil is emptied are spaced likewise. As used herein, radial distance is measured along lines perpendicular to axis 82. By way of example, the longitudinal axis of each nozzle 90 might be positioned above 0.5R to about 0.8R from axis 82, whereas the longitudinal axis of each nozzle 92 might be placed about 0.75R to 0.90R from axis 82, where R is the radius of the opening formed at the upper end 70 of wall 58. The slurry nozzles 92 are spaced from axis 82 as described above to maximize the volume in chamber 52 occupied by the jet or spray pattern from the nozzles. Due to the slot in the inner tube of a nozzle 92, steam exiting from the slot disperses slurry oil in a spray pattern covering only about 118° to about 120° in a direction toward axis 82. Thus, by maximizing the spacing of nozzles 92 from axis 82, a greater cross-sectional area of the chamber is available for the jet or spray pattern to diverge so as to occupy more volume in the chamber. As will be explained in more detail below, maximizing the volume occupied by jets from the nozzles is desirable, since this tends to minimize the formation of eddies within the chamber. Also, as shown in FIG. 2, slurry nozzles 92 are positioned so as to empty oil into the chamber from a position closer in axial distance to the chamber opening than the position from which topped crude oil is emptied from nozzle 90. As used herein, axial distance is that distance measured along lines parallel to axis 82. Because of this axial positioning of nozzles 92, atomized oil being sprayed in a general horizontal direction does not impinge directly on nozzles 90. This tends to prevent the development of a thick coating of oil on nozzles 90 and a consequent coke buildup.

If desired, wear plates or shrouds could be placed around the exposed portions of nozzles 90 and 92 in the chamber to assist in protecting these nozzles from the erosive effect of catalyst particles flowing through the chamber. These wear plates could comprise steel pipes, for example. Also, gaps can be provided between nozzles 90 and 92 and wall 58 through which steam can leak into chamber 52 to further assist in atomization.

Fan or spray type nozzles 94 (only two of which are shown) are also preferably provided which extend through wall 58 so as to empty into the chamber at points above nozzles 90 and 92. Nozzles 94 are typically circumferentially spaced around axis 82. Each nozzle 94 includes a capped tube having a slit in its sidewall which faces the opening at the top of the chamber. Steam is supplied to nozzles 84 via a hollow half ring 96 mounted to wall 58 so as to be in fluid communication with the nozzles 94. As shown, half ring 96 is connected to a source of steam 46. Steam from nozzles 94 assists in keeping the interior surface 80 clean and free of catalyst.

Figure 3:
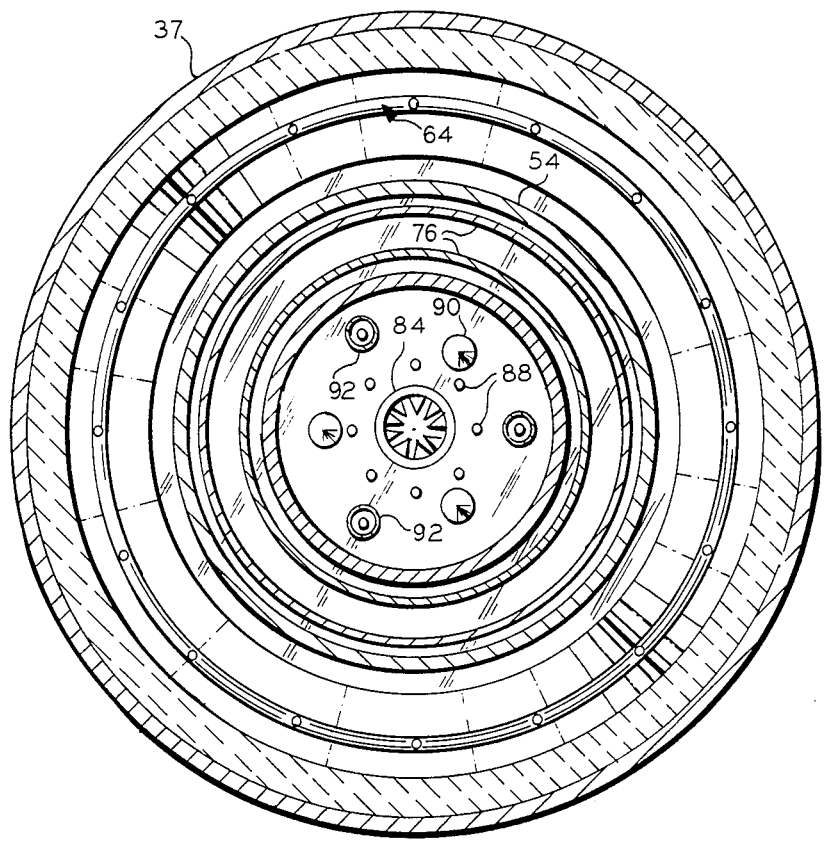
FIG. 3 is an illustration of a cross-section of the lift pot shown in FIG. 2 as would be seen when viewed along lines 3—3.

Referring now to FIG. 3, there is shown an illustration of a cross section of the lift pot of FIG. 2 as viewed along lines 3—3. As shown, nozzles 90 are preferably circumferentially spaced around the chamber axis and central nozzle 84. Similarly, nozzles 92 are also circumferentially spaced around the axis.

Figure 4:
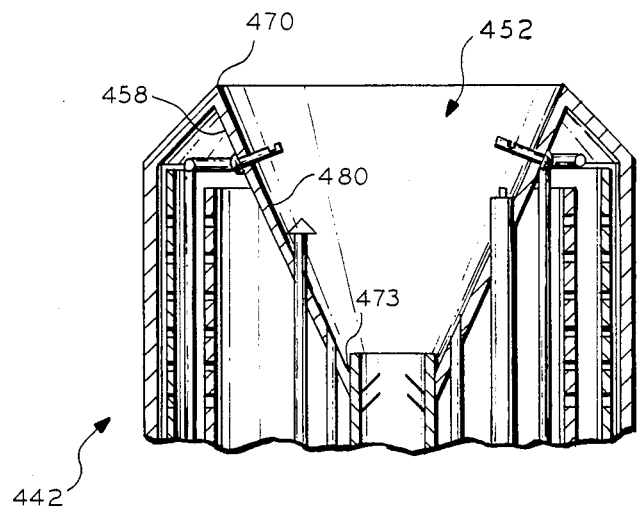
FIG. 4 is a cross-sectional view of a generally conical atomization chamber according to a second embodiment.
Figure 5:
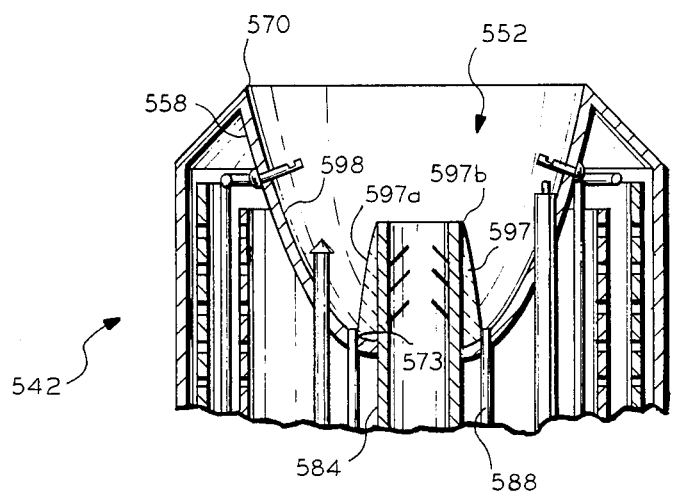
FIG. 5 is a cross-sectional view of a generally parabolic atomization chamber having a protruding interior surface portion according to a third embodiment.
Figure 6:
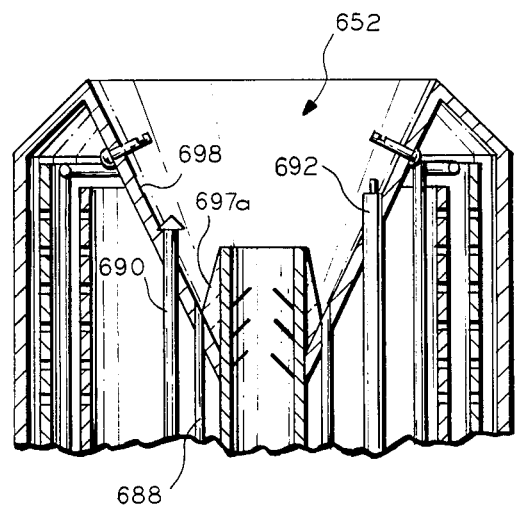
FIG. 6 is a cross-sectional view of a generally conical atomization chamber having a protruding interior surface portion according to a fourth embodiment.

Several other embodiments of the present invention will now be described in reference to FIGS. 4–6. In each figure, only a portion of a nozzle assembly is shown. However, it should be understood that the nozzle assembly could be employed in the lift pot of a cracking unit as illustrated with respect to nozzle assemble 42 in FIGS. 2 and 3. The structure of each of a embodiments illustrated in FIGS. 4–6 is substantially similar to that shown in FIGS. 2 and 3 except for the structure forming the atomization chamber. In particular, slurry and topped crude nozzles are positioned similarly. Therefore, FIGS. 4–6 will each be discussed in regard to the atomization chamber structure only.

Referring now to FIG. 4, a cross-sectional view of a nozzle assembly 442 according to the second embodiment is shown. Nozzle assembly 442 includes a wall 458 having an interior surface 480 which defines a chamber 452. As shown, interior surface 480 is generally conical in shape. The embodiment shown in FIG. 4 resembles the FIG. 2 embodiment, however, in that the interior surface of the wall 458 tapers from open end 470 to boundary 473 at the lower end of the wall.

Referring now to FIG. 5, a third embodiment of the present invention is shown. Here, a nozzle assembly 542 includes a wall 558 and a molded buildup of refractory material 597 on the interior surface of the wall. The wall 558 and refractory buildup 597 together make up a member whose interior surface defines a chamber 552. The interior surface which defines the chamber is made up of a first interior surface portion 598 which extends from the upper end of wall 558 to an interior surface boundary 573 at the edge of the buildup, and a second interior surface portion 597a which comprises the surface of the buildup. The boundary 573 is closed, generally circular in this case, and generally coaxial with respect to the chamber axis. The buildup 597 is formed such that the second interior surface portion 597a protrudes from the surrounding interior surface so as to axially extend from the boundary 573 toward the chamber opening. In addition, the buildup and its respective second interior surface portion 597a has an upper end which lies between the chamber opening and boundary 573. By way of example, end 597b can be positioned within the chamber to be axially spaced ½D to D from the upper end of wall 558, where D is the diameter of the opening formed by the upper end of the wall. In the embodiment of FIG. 5, each of the interior surface portions 597a and 598 is generally parabolic in shape, such that first portion 698 tapers toward the chamber axis from end 570 to boundary 573, and second portion 597a tapers toward the axis from the boundary to end 597b. In addition, nozzles 588 are positioned to empty atomizing gas into chamber 552 from a position closely adjacent to boundary 573. A central nozzle 584 extends through the buildup 597 along the chamber axis such that it empties into chamber 552 adjacent end 597b. In operation, trash such as refractory fragments and catalyst will tend to accumulate in the portion of the chamber between the interior surface portions reducing the chance of blocking an oil nozzle. Furthermore, oil and small catalyst particles which accumulate in this manner will be redispersed by gas from nozzles 588.

Although the second inferior surface portion 597a is described as being formed by buildup of refractory material, many alternatives to this structure are possible. For example, wall 558 could be adapted to define the second interior surface portion.

Referring now to FIG. 6, there is shown a fourth embodiment of the invention which has an atomization chamber 652 shaped in a manner similar to that in FIG. 5. Here, however, there is provided a generally conical first interior surface portion 698 and a generally conical second interior surface portion 697a. The first interior surface portion 698 forms an acute angle with respect to a plane which orthogonally intersects the chamber axis. Preferably, this acute angle is greater than or equal to the internal angle of friction of the catalyst. The internal angle of friction for cracking catalysts is typically about 70° to about 78°. By sloping the first interior surface portion in this manner, catalyst particles impinging on portion 698 will tend to flow in a downward direction to the region between the interior surface portions, where catalyst particles will be redispersed by nozzles 688. Thus, the likelihood of catalyst accumulations and possible clogging of nozzles 690 and 692 is minimized.

In each of the four embodiments illustrated in FIGS. 2–6, therefore, a hollow member is provided having an interior surface which defines a chamber. At least a portion of the interior surface tapers toward the chamber axis from a member open end to an interior surface boundary axially opposite the open end. The various nozzles inject oil and atomizing gas in V-shaped jets which generally conform to the shape of the chamber as described above. Thus, the shape of the chamber minimizes "dead spaces" in the chamber wherein there is little upward velocity fluid flow. Background gas in the chamber, which is primarily atomizing gas or steam in the illustrated embodiments, tends to backflow into such "dead spaces" which causes eddies to form. These swirling eddies may have entrained catalyst associated therewith which can cause considerable erosion of the member which defines the chamber. Also, eddies will typically cause oil droplets to accumulate on the interior surface of the chamber forming member, such accumulations possibly breaking down to coke which can clog nozzles. Thus, by reducing the cross-sectional area across the atomization chamber by means of a chamber forming member shaped according to the present invention, catalyst erosion and coke buildup in the chamber are minimized due to the minimizing of eddy formations. This minimization of eddies in the atomization chamber also enhances the likelihood of a relatively uniform exit velocity of atomized oil from the chamber.

Although the preferred embodiments are described as having a background gas substantially comprising steam, it should be understood that other fluids could conceivably be used. Moreover, a chamber designed according to the present invention could be applied to any system in which a need arises to inject one fluid into a chamber having another fluid therein which can backflow as described above to form eddies.

EXAMPLES

The following illustrates how the invention might be used in a commercial unit. Using the equipment described in FIGS. 1, 2 and 3, the following specific conditions can be employed.

| Item | |
|---|---|
| (34) Regenerator diameter feet-inches (I.D.) | 45' 2" |
| (34) Regenerator length feet-inches | 67' 8" |
| (8) Reactor (disengager) diameter feet-inch (I.D.) | 26' 0" |
| (8) Reactor (disengager) length feet overall | 54' 0" |
| (7) Reactor riser diameter I.D. inches | 42" |
| (7) Reactor riser height feet-inches | 88' 6" |
| (37) Lift pot diameter feet-inches | 7' 0" |
| (37) Lift pot height overall feet-inches | 7' 11" |
| (38) Catalyst conduit diameter (I.D.) feet-inches | 2' 2" |
| (39) Catalyst slide valve diameter (I.D.) feet-inches | 2' 6" |

| Operating Conditions | Regenerator | Disengager | Reactor |
|---|---|---|---|
| Outlet temperature °F. | 1298 | 928 | |
| Dilute phase temperature °F. | 1312 | 900 | |
| Top pressure psia | 19.7 | 24.2 | |
| Riser inlet temperature °F. | | | 1011 |
| Riser feed temperature °F. | | | 702 |
| Riser out temperature °F. | | | 951 |
| Reactor stripper temperature °F. | | 950 | |
| Stripping steam lb/hr | | 5500 | |
| Stripping steam lb/ton catalyst | | 7.2 | |
| Riser cat/oil ratio | | | 4.3 |
| Riser Velocity feet/sec | | | 50 |
| Residence time seconds | | | 1.8 |
| Catalyst circulation tons/min | | | 12.7 |
| Total regenerator air (SCFM) | 85,300 | | |
| Air blower discharge temperature °F. | 310 | | |
| Air blower discharge pressure psia | 38 | | |

| Fresh Feed Oil Charge Volumes and Temperatures BPD, °API °F. | BPD | °API | °F. |
|---|---|---|---|
| Virgin gas oil | 10,000 | 32.8 | 750 |
| Heavy cycle oil | 7,200 | 20.3 | 780 |
| Topped crude | 8,000 | 14.0 | 800 |
| Reslurry oil | 2,400 | 10.9 | 680 |
| Precipitator backwash | 1,200 | 10.8 | 480 |
| Total fresh feed | 28,800 | — | — |
| Steam, 125 psig, 500° F. | | | |
| To V. Gas oil perheater lb/hr | 4,000 | | |
| To slurry nozzle lb/hr | 3,000 | | |
| All other cartridge stm lb/hr | 11,000 | | |
| Total steam usage | 18,000 | | |

| Lift Pot | | |
|---|---|---|
| Item | | Dimension |
| (64,) (66) | Two 3-inch sch. 160 304 SS. steam rings with 42½ inch diameter steam holes | 5 ft 6 in OD |
| (42) | Nozzle cartridge assembly, outside refractory diameter | 4 ft. 4 in |
| | overall height | 9 ft 5¼ in |
| | Upper end of nozzle cartridge assembly rounded with ½ inch radius with ⅛ inch outer layer of Stellite #1 over | As described |
| | a ⅛ inch inner layer of Stellite #6 over a nosing bar | |
| (80) | Interior surface of wall 58 parabolically shaped according to the expression $x^2 = 7.225y$, where the y-axis corresponds to axis 82 and the x-axis is perpendicular to axis 82. | |
| (52) | Length of chamber | 40 in |
| | Diameter of chamber at upper end 70 | 34 in |
| (44) | 3 Heavy cycle and topped crude feed pipes nom. sch 80 typical | 4 in |
| (45) | 1 Virgin gas oil feed pipe nom sch 80 | 10 in |
| (46) | Dispersion steam pipes and rings 1½ inch sch. 80 with 2 ft 8 in diameter ring of 1½-inch sch. 80 with 60 3/16 inch steam holes | 1½ in |
| (47) | 3 Reslurry oil and separator backwash feed line 4 in sch. 80 nom. diameter with interior steam pipe of 2½ in diameter sch. 160 typical | 2½ in O.D. inside 4 in O.D. |
| (50) | Lift pot interior refractory surface | 6 ft 3 in I.D. |
| (7) | Lower end of riser interior refractory I.D. | 42 in |
| (68) | Catalyst acceleration zone 96 defined between upper surface 92 of end wall 56 and interior surface of section 37b of catalyst lift pot 37. | 4 to 5 inches surfaces. Throat measures about 600 in². Surfaces converge toward axis at about a 45° angle. |
| (60) | Catalyst lift chamber, annular width with annulus circumferentially 360° around nozzle cartridge assembly | 11½ in |
| (86) | Turbulence generating members welded at 15° angle to axis and pentagonally shaped with overall dimension of 1¼ inch by 2 inch with four rows of deflectors, 16 deflectors per row, rows are staggered | |
| (88) | Dispersal steam pipes of 1 to 1½ inch nominal pipe diameter | |
| (90) | 3 nozzles, each 4 inch nom. diameter and circumferentially spaced apart, radius to axis 82 for each nozzle | 10.3 in |
| (92) | 3 nozzles, each 4 inch nom. diameter and circumferentially spaced apart 11 3/16 inch, radium to axis 82 for each nozzle | 3.6 in |
| (74) | Perforated steam ring 1 inch sch. 80 3 feet 7 inches in diameter | |
| (76) | 2 Radiation shielding baffle members, perforated ⅜ inch thick steel plates cylindrical shaped, ½ inch diameter holes, 4-inch center line distance between holes, plates are 1 inch apart, holes are misaligned | |
| (94) | 10 steam wall sparging nozzles each made of 1-inch SCH 80 pipe capped with ½-inch thick circular welded plate, each nozzle extending into parabola 2-inches perpendicular to wall with 120° nozzle slot ¼ inch wide cut parallel with wall, and centerline of nozzle slot 1-inch from cap plate weld | |
| (59c) | 5 feet-5 inches diameter flange 4 inches thick carbon steel with 60-1⅜ inch diameter holes on a 60 inch bolt circle | |

Obviously many modifications and variations of the present invention are possible in light of the above teachings. It is therefore to be understood that within the scope of the appended claims the invention may be practiced otherwise than as specifically described.

That which is claimed is:

1. A fluid feeding method comprising:
   injecting an oil feedstock and an atomizing fluid for atomizing the oil feedstock from a plurality of nozzles which empty into a chamber defined by the interior surface of a hollow member which has an axis and an open end which defines an opening, wherein at least a portion of the interior surface progressively tapers toward the axis from the open end to an interior surface boundary axially opposite the open end, the oil feedstock and atomizing fluid being injected from the nozzles into the area of the chamber within said interior surface portion and toward the opening so as to exit the chamber through the opening, wherein topped crude oil is injected from a first position within said chamber and wherein slurry oil is injected from a second position within said chamber, said second position being radially spaced farther from the axis than said first position, where radial spacing is measured along lines perpendicular to the axis;

introducing a fluidized cracking catalyst adjacent to the opening such that the oil feedstock exiting the chamber and the catalyst mix to yield a mixture; and passing the mixture through a riser reactor.

2. A method as recited in claim 1, wherein in said injecting step, oil feedstock is injected from a central position in the chamber along the axis and from a plurality of positions in the chamber spaced around the axis.

3. A method as recited in claim 2, wherein atomizing fluid is injected from a position closely adjacent to the boundary.

4. A method as recited in claim 1, wherein the second position is closer in axial distance to the opening than the first position, axial distance being measured along a line parallel to the axis.

5. A method as recited in claim 1, wherein the catalyst flows generally radially inward past the open end to mix with oil feedstock exiting the chamber.

* * * * *